United States Patent Office 3,555,153
Patented Jan. 12, 1971

3,555,153
PESTICIDAL COMPOSITIONS COMPRISING BENZAMIDES AND THIOPHOSPHONATES AND METHOD OF USE
David L. Watson, Glen Ellyn, Ill., assignor to Velsicol Chemical Corporation, Chicago, Ill., a corporation of Delaware
No Drawing. Filed Apr. 19, 1968, Ser. No. 722,552
Int. Cl. A01n 9/02, 9/36
U.S. Cl. 424—222
3 Claims

ABSTRACT OF THE DISCLOSURE

An acaricidal and insecticidal composition comprising in combination a first compound selected from the group of compounds having the formula

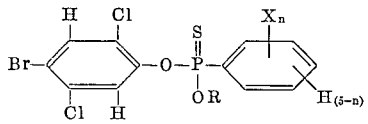

wherein R is alkyl; each X is selected from the group consisting of alkyl, alkoxy, alkylthio, halogen and nitro; and $n$ is an integer from 0 to 5, provided that a maximum of three X's are nitro; and a second compound selected from the group of compounds having the formula

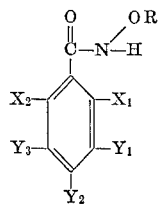

wherein $X_1$ and $X_2$ are independently selected from the group consisting of alkyl, alkenyl, alkoxy, alkenyloxy, halogen, nitro, amino, alkylamino and dialkylamino; and $Y_1$, $Y_2$ and $Y_3$ are independently selected from the group consisting of hydrogen, alkyl, alkenyl, alkoxy, alkenyloxy, halogen, nitro, amino, alkylamino, and dialkylamino, provided that a minimum of two of $X_1$, $X_2$, $Y_1$, $Y_2$ and $Y_3$ are alkoxy, and provided that a maximum of two of $X_1$, $X_2$, Y, $Y_2$ and $Y_3$ are selected from the group consisting of nitro, amino, alkylamino and dialkylamino; and R is an alkyl group containing from 1 to 4 carbon atoms. A method for the control of acarids and insects which comprises applying to the locus of said acarids and insects in a quantity toxic to acarids and insects a composition heretofore described.

This invention relates to pesticidal compositions and more particularly relates to new compositions which are unexpectedly effective in controlling acarids and insects.
Chemical compounds of the general formula

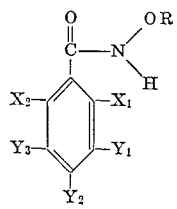

wherein $X_1$ and $X_2$ are independently selected from the group consisting of alkyl, alkenyl, alkoxy, alkenyloxy, halogen, nitro, amino, alkylamino, and dialkylamino; and $Y_1$, $Y_2$ and $Y_3$ are independently selected from the group consisting of hydrogen, alkyl, alkenyl, alkoxy, alkenyloxy, halogen, nitro, amino, alkylamino, and dialkylamino, provided that a minimum of two of $X_1$, $X_2$, $Y_1$, $Y_2$ and $Y_3$ are alkoxy, and provided that a maximum of two of $X_1$, $X_2$, $Y_1$, $Y_2$ and $Y_3$ are selected from the group consisting of nitro, amino, alkylamino, and dialkylamino; and R is an alkyl group containing from 1 to 4 carbon atoms have been found to have valuable acaricidal properties. To be effective in the control of acarids the compounds falling within this group must be applied at very high concentrations. The requirement for excessive concentrations of active compounds often results in difficulties during the formulation of such compounds; and in many instances it becomes prohibitive to apply pesticides at these high concentrations due to the cost of such applications. Thus, for practical use, pesticide formulations requiring only low concentrations of active ingredients to effectively control pests are very desirable.

It has now been discovered that an acaricidal and insecticidal composition comprising in combination a first compound selected from the group of compounds having the formula

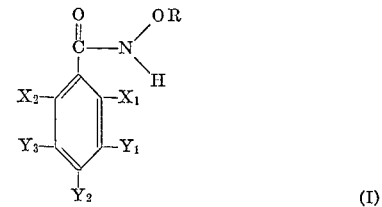
(I)

wherein $X_1$, $X_2$, $Y_1$, $Y_2$, $Y_3$ and R are as hereinabove described, and a second compound selected from the group of compounds having the formula

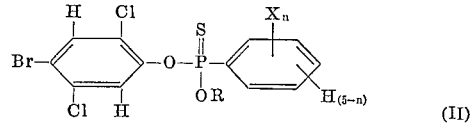
(II)

wherein R is alkyl; each X is selected from the group consisting of alkyl, alkoxy, alkylthio, halogen and nitro; and $n$ is an integer from 0 to 5, provided that a maximum of three X's are nitro, is unexpectedly effective in controlling acarids at exceedingly lower concentrations of active ingredients than heretofore possible with separate applications of the individual compounds.

In a preferred embodiment of this invention the substituted benzamide compounds of Formula I are selected from the group of compounds wherein the constituents $X_1$ and $X_2$ are independently selected from the group consisting of lower alkyl, lower alkenyl, lower alkoxy, lower alkenyloxy, halogen, nitro, amino, lower alkylamino and di(lower alkyl) amino; the constituents $Y_1$, $Y_2$ and $Y_3$ are independently selected from the group consisting of hydrogen, lower alkyl, lower alkenyl, lower alkoxy, lower alkenyloxy, halogen, nitro, amino, lower alkylamino and di(lower alkyl) amino; and the thiophosphonate compounds of Formula II are selected from the group of compounds wherein the R substituent is lower alkyl; each X is selected from the group consisting of lower alkyl, lower alkoxy, lower alkylthio, chlorine, bromine and nitro; and $n$ is an integer from 0 to 3.

Exemplary of the benzamide compounds of Formula I which are suitable for the purpose of the present invention are N,2,4-trimethoxy-6-propylbenzamide,
N-methoxy-2,6-diethoxybenzamide,
N,2,6-trimethoxy-3-aminobenzamide,
N,2,6-trimethoxy-4-chlorobenzamide,
N,2,6-trimethoxy-3,5-diiodobenzamide,
N,3,6-trimethoxy-2-bromobenzamide,
N,3,6-trimethoxy-2-methylbenzamide,
N,3,4,6-tetramethoxy-2-methylbenzamide,
N,3,6-trimethoxy-2-nitrobenzamide,
N,2,6-trimethoxy-4-pentylbenzamide,
N,4,6-trimethoxy-2-methyl-3-bromobenzamide,
N,4,6-trimethoxy-2-ethoxybenzamide,
N,2,6-trimethoxy-4-ethoxy-3-chlorobenzamide,
N,2,4,6-tetramethoxy-3-chlorobenzamide,
N,6-dimethoxy-2,4-diethoxybenzamide,
N,2,6-trimethoxy-4-pentadecylbenzamide,
N,2,4-trimethoxy-6-propenylbenzamide,
N-ethoxy-2,6-dimethoxy-3,5-dichlorobenzamide,
N-ethoxy-2,6-dimethoxy-3-nitrobenzamide,
N-ethoxy-2,4-dimethoxy-6-propylbenzamide,
N-ethoxy-2,6-dimethoxy-3-aminobenzamide,
N-ethoxy-3,6-dimethoxy-2-methylbenzamide,
N-ethoxy-2,6-dimethoxy-3-chlorobenzamide,
N-ethoxy-3,6-dimethoxy-2-nitrobenzamide,
N-ethodxy-2,6-dimethoxy-4-pentylbenzamide,
N,2-diethoxy-4,6-dimethoxybenzamide,
N-2,4,6-tetraethoxybenzamide,
N,2,4-triethoxy-6-methoxybenzamide,
N-ethoxy-2,6-dimethoxy-6-propenylbenzamide,
N-propoxy-2,6-dimethoxy-3-nitrobenzamide,
N-propoxy-2,6-dimethoxy-3,5-dibromobenzamide
N-propoxy-2,6-dimethoxy-4-nitrobenzamide,
N-propoxy-2,4-dimethoxy-6-propylbenzamide,
N-propoxy-2,6-diethoxybenzamide,
N-propoxy-2,6-dimethoxy-4-bromobenzamide,
N-propoxy-4,5,6-trimethoxy-2-methylbenzamide,
N-propoxy-4,6-dimethoxy-2-ethoxybenzamide,
N-propoxy-2,4,6-triethoxy-3-chlorobenzamide,
N-propoxy-2,4-dimethoxy-6-propenylbenzamide,
N-butoxy-2,6-dimethoxy-3,5-dichlorobenzamide
and the like.

Exemplary of the thiophosphonate compound of Formula II are

O-methyl O-2,5-dichloro-4-bromophenyl phenylthiophosphonate,
O-ethyl O-2,5-dichloro-4-bromophenyl phenylthiophosphonate,
O-n-propyl O-2,5-dichloro-4-bromophenyl phenylthiophosphonate,
O-methyl O-2,5-dichloro-4-bromophenyl 2,4-dichlorophenylthiophosphonate,
O-ethyl O-2.5-dichloro-4-bromophenyl 2-methyl-4-chorophenyl-thiophosphonate,
O-ethyl O-2.5-dichloro-4-bromophenyl-4-nitrophenyl-thiophosphonate,
O-ethyl O-2,5-dichloro-4-bromophenyl 4-methoxyphenylthiophosphonate,
O-ethyl O-2,5-dichloro-4-bromophenyl 2-chloro-4-nitrophenylthiophosphonate,
O-ethyl O-2,5-dichloro-4-bromophenyl 3-methylphenylthiophosphonate,
O-ethyl O-2,5-dichloro-4-bromophenyl 2-methylphenylthiophosphonate,
O-ethyl O-2,5-dichloro-4-bromophenyl 4-methylphenylthiophosphonate,
O-ethyl O-2,5-dichloro-4-bromophenyl 4-methylthiophenylthiophosphonate,
and the like.

A variety of ratios of the active ingredients in the compositions of the present invention can be used but a ratio of the first compound of Formula I to that of the second compound of Formula II of about 1 to 20 to about 20 to 1 is preferred, and a ratio of 1 to 10 to about 10 to 1 is most preferred.

The substituted benzamide compounds of Formula I can be prepared readily from the corresponding benzoyl chloride having the structural formula

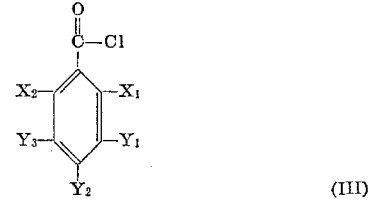

(III)

wherein $X_1$, $X_2$, $Y_1$, $Y_2$ and $Y_3$ are hereinabove described, by reacting the compound of Formula III with an appropriately substituted amine or amine hydrochloride. To effect this reaction the substituted benzoyl chloride of Formula III can be added, with cooling, to a mixture of the amine or amine hydrochloride and an aqueous solution of base, such as potassium carbonate or potassium hydroxide. It is preferred to utilize a solvent, such as benzene or chloroform in the reaction mixture. After the addition has been completed the reaction can be continued by stirring for a period of about ½ to about 7 hours.

The reaction product can be isolated from the reaction mixture by separating the aqueous and organic phases, drying and filtering the organic phase, and distilling of the solvent therefrom if soluble in the solvent; or by filtering the reaction mixture if the reaction product is insoluble in the solvent. The desired product can be used as such or can be purified by recrystallization from a suitable solvent.

The acid chlorides having the structural Formula III can be prepared from the corresponding acid having the following structure

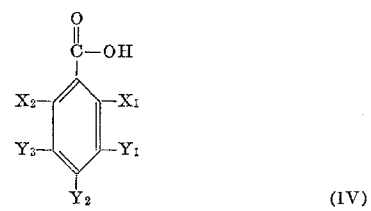

(IV)

wherein $X_1$, $X_2$, $Y_1$, $Y_2$, $Y_3$ are as heretofore described, by reacting the substituted benzoic acid of structure IV with a excess of a chlorinating agent such as thionyl chloride or phophorus pentachloride in an inert organic solvent such as benzene if desired. The reaction can be performed by heating, preferably at reflux for a period of from about 1 to about 8 hours. The reaction mixture can be distilled under vacuum to remove excess chlorinating agent and the solvent if used. The residue can be purified by distillation, recrystallization or both to yield the desired substituted benzoyl chloride.

Suitable substituted benzoic acids having the structural Formula IV for use in preparing the compounds of this invention are exemplified by 2,6-dimethoxy-3,5-dichlorophenzoic acid,
2,6-dimethoxy-3-nitrobenzoic acid,
2,6-dimethoxybenzoic acid,
2,6-dimethoxy-3-bromobenzoic acid,
2,6-dimethoxy-3,5-dibromobenzoic acid,
2,4,6-trimethoxybenzoic acid,
2,6-dimethoxy-4-nitrobenzoic acid,
2,4-dimethoxy-6-propylbenzoic acid,
2,6-diethoxybenzoic acid,
2,6-dimethoxy-3-aminobenzoic acid,
2,6-dimethoxy-4-bromobenzoic acid,
2,6-dimethoxy-4-chlorobenzoic acid,
2,6-dimethoxy-3,5-diiodobenzoic acid, 3,6-dimethoxy-2-bromobenzoic acid,
3,6-dimethoxy-2-methylbenzoic acid,
3,4,6-trimethoxy-2-methylbenzoic acid,
4,5,6-trimethoxy-2-methylbenzoic acid,
2,6-dimethoxy-3-chlorobenzoic acid,
3,6-dimethoxy-2-nitrobenzoic acid,
2,6-dimethoxy-4-pentylbenzoic acid,
4,6-dimethoxy-2-methyl-3-bromobenzoic acid,
4,6-dimethoxy-2-methyl-3,5-dibromobenzoic acid,
4,6-dimethoxy-2-ethoxybenzoic acid,
2,6-dimethoxy-4-ethoxybenzoic acid,
2,4,6-triethoxybenzoic acid,
2,6-dimethoxy-4-ethoxy-3-chlorobenzoic acid,
2,4,6-triethoxy-3-chlorobenzoic acid,
2,4,6-trimethoxy-3-chlorobenzoic acid,
2,4-diethoxy-6-methoxybenzoic acid,
3,6-diethoxy-2-methoxybenzoic acid,
2,6-dimethoxy-4-pentadecylbenzoic acid,
2,4-dimethoxy-6-propenylbenzoic acid, and the like.

Examples of suitable alkoxyamines for use in preparing the compounds of this invention are exemplified by methoxyamine, ethoxyamine, n-propoxyamine, isopropoxyamine and butoxyamine.

Examples of suitable alkoxyamine hydrochlorides for use in preparing the compounds of this invention are exemplified by methoxyamine hydrochloride, ethoxyamine hydrochloride, n-propoxyamine hydrochloride, isopropoxyamine hydrochloride and butoxyamine hydrochloride.

The manner in which the new compounds of the present invention can be prepared readily is illustrated in the following examples.

EXAMPLE 1

Preparation of N,2,6-trimethoxy-3-chlorobenzoyl chloride 2,6-dimethoxy-3-chlorobenzoic acid (5.9 grams; 0.027 mole), toluene (12 ml.) and thionyl chloride (2.2 ml.; 0.030 mole) were charged into a 50 ml. glass reaction flask equipped with a reflux condenser with drying tube. The mixture was heated at reflux with continuous stirring for about 7 hours. After this time the reaction mixture was treated with activated charcoal and filtered. The filtrate was distilled under aspirator pressure to remove the toluene and excess thionyl chloride to give 2,6-dimethoxy-3-chlorobenzoyl chloride as the residue.

EXAMPLE 2

Preparation of N,2,6-trimethoxy-3-chlorobenzamide

Potassium carbonate (2.6 grams; 0.019 mole), methoxyamine hydrochloride (1.4 grams; 0.017 mole), and benzene (50 ml.) were placed in a 300 ml. glass reaction flask equipped with stirrer, reflux condenser and addition funnel. This mixture was cooled in an ice bath and water (5 ml.) was added followed by the slow addition of 2,6-dimethoxy-3-chlorobenzoyl chloride (4.0 grams; 0.017 mole) prepared in Example 1. The ice bath was replaced by a heating mantle and the reaction mixture heated at reflux with continuous stirring for about 7 hours. After this time the reaction mixture was cooled and filtered. The filter-cake was triturated in hot chloroform and the triturate and filtrate were combined. The organic phase was separated from the aqueous phase, dried over magnesium sulfate, filtered and evaporated under aspirator pressure using a rotary evaporator. The residue, a white solid, was recrystallized from a toluene-chloroform-pentane mixture, washed with pentane and dried in a desiccator under vacuum to yield N,2,6-trimethoxy-3-chlorobenzamide having a melting point of 133–135° C. and having the following elemental analysis:

Analysis.—Calc'd for $C_{10}H_{12}ClNO_4$ (percent): Theory: C, 48.88; H, 4.89; Cl, 14.46; N, 5.70. Found: C, 48.52; H, 4.92; Cl, 14.40; N, 5.64.

EXAMPLE 3

Preparation of 2,6-dimethoxy-3,5-dichlorobenzoyl chloride 2,6-dimethoxy-3,5-dichlorobenzoic acid (25.6 grams; 0.102 mole) toluene (50 ml.) and thionyl chloride (8.0 ml.; 0.112 mole) were charged into a 300 ml. glass reaction flask equipped with stirrer, thermometer and reflux condenser with drying tube. The mixture was heated at reflux with continuous stirring for about 6½ hours. After this time the reaction mixture was treated with activated charcoal and filtered. The filtrate was dried over magnesium sulfate, filtered and distilled under aspirator pressure to remove the toluene and excess thionyl chloride to yield 2,6-dimethoxy-3,5-dichlorobenzoyl chloride as the residue.

EXAMPLE 4

Preparation of N,2,6-trimethoxy-3,5-dichlorobenzamide

Potassium carbonate (8.0 grams; 0.058 mole), methoxyamine hydrochloride (4.4 grams; 0.53 mole) and benzene (100 ml.) were placed in a 300 ml. glass reaction flask equipped with stirrer, reflux condenser and addition funnel. This mixture was cooled in an ice bath and 10 ml. of water were added followed by the slow addition of 2,6 - dimethoxy - 3,5 - dichlorobenzoyl chloride (14.2 grams; 0.053 mole), prepared above. The ice bath was replaced by a heating mantle and the reaction mixture was heated at reflux with continuous stirring for about 7 hours. After this time the reaction mixture was cooled and filtered. The filter cake was triturated in hot chloroform and the triturate and filtrate were combined. The organic phase was separated from the aqueous phase, dried over magnesium sulfate, filtered and evaporated under aspirator pressure using a rotary evaporator. The residue, a white solid, was recrystallized from a benzene-pentane mixture, washed with pentane and dried in a desiccator under vacuum to yield N,2,6-trimethoxy-3,5-dichlorobenzamide having a melting point of 148–151° C. and having the following elemental analysis:

Analysis.—Calc'd for $C_{10}H_{11}Cl_2NO_4$ (percent): Theoretical: C, 42.86; H, 3.93; Cl, 25.36; N, 5.00. Actual: C, 43.17; H, 4.06; Cl, 25.13; N, 4.92.

EXAMPLE 5

Preparation of 2,6-dimethoxy-3-nitrobenzoyl chloride 2,6-dimethoxy-3-nitrobenzoic acid (15.6 grams) and thionyl chloride (25 ml.) were placed in a 100 ml. round bottom glass reaction flask equipped with stirrer, thermometer and reflux condenser. The reaction mixture was heated at reflux for about 2 hours with continuous stirring. After this time the reaction mixture was distilled under vacuum to remove the excess thionyl chloride to yield 2,6-dimethoxy-3-nitrobenzoyl chloride as the residue.

EXAMPLE 6

Preparation of N,2,6-trimethoxy-3-nitrobenzamide

Potassium hydroxide (15.6 grams) dissolved in water (60 ml.), chloroform (125 ml.) and methoxyamine hydrochloride (8.4 grams) were charged into a 500 ml. glass reaction flask equipped with stirrer and thermometer. The reaction mixture was cooled in an ice bath followed by the incremental addition of 2,6-dimethoxy-3-nitrobenzoyl chloride prepared above. A solid precipitate was formed during the addition of the acid chloride. The reaction mixture was then stirred for an additional period of about 1 hour. After this time the mixture was filtered, the filter cake washed with water, air dried, and recrystallized from ethanol to yield N,2,6-trimethoxy-3-nitrobenzamide having a melting point of 171–172.5° C. and having the following elemental analysis:

Analysis.—Calc'd for $C_{10}H_{12}N_2O_6$ (percent): Theoretical: C, 46.87; H, 4.69; N, 10.94. Actual: C, 47.11; H, 5.07; N, 10.66.

EXAMPLE 7

Preparation of N,2,6-trimethoxybenzamide

Potassium hydroxide (7.9 grams) dissolved in water (60 ml.) and chloroform (150 ml.) were placed in a 500 ml. glass reaction flask equipped with stirrer and thermometer. The mixture was stirred and cooled to about 10° C. in an ice bath after which methoxyamine hydrochloride (5.9 grams) was added followed by the incremental addition of 2,6-dimethoxybenzoyl chloride (12.7 grams) dissolved in chloroform (40 ml.). The stirring was continued for about ½ hour. After this time the organic phase was separated from the aqueous phase. The organic phase was dried over anhydrous magnesium sulfate, filtered and evaporated under vacuum to yield a partially solidified oil as the residue. The residue was recrystallized from a chloroform-pentane mixture to yield N,2,6-trimethoxybenzamide having a melting point of 118–122.5° C. and having the following elemental analysis:

*Analysis.*—Calc'd for $C_{10}H_{13}NO_4$ (percent): Theoretical: C, 56.87; H, 6.16; N, 6.63. Actual: C, 57.01; H, 6.48; N, 5.79.

EXAMPLE 8

Preparation of N,2,6-trimethoxy-3-bromobenzamide

Potassium hydroxide (1.7 grams) dissolved in water (20 ml.), methoxyamine hydrochloride (1.3 grams) and carbon tetrachloride (20 ml.) were charged into a 100 ml. reaction flask equipped with stirrer and reflux condenser. The reaction mixture was cooled and 2,6-dimethoxy-3-bromobenzoylchloride (2.3 grams) dissolved in carbon tetrachloride (30 ml.) was added. The reaction mixture was stirred for a period of about 45 minutes and poured into a separatory funnel. The carbon tetrachloride layer was drawn off, dried over anhydrous magnesium sulfate, filtered, and evaporated under aspirator pressure leaving a solid as the residue. The solid residue was recrystallized from a carbon tetrachloride pentane mixture to yield N,2,6-trimethoxy-3-bromobenzamide as the product having a melting point of 137 to 138° C.

EXAMPLE 9

Preparation of N,2,6-trimethoxy-3,5-dibromobenzamide

Potassium carbonate (8.0 grams) and benzene (100 ml.) are placed in a 300 ml. glass reaction flask equipped with stirrer, reflux condenser and addition funnel. This mixture is cooled in an ice bath and 10 ml. of water are added followed by the slow addition of 2,6-dimethoxy-3,5-dibromobenzoyl chloride (14.2 grams). The ice bath is replaced by a heating mantle and the reaction mixture heated at reflux with continuous stirring for about 7 hours. After this time the reaction mixture is cooled and filtered. The filter cake is triturated in hot chloroform and the triturate and filtrate are combined. The organic phase is separated from the aqueous phase, dried over magnesium sulfate, filtered and evaporated under aspirator pressure using a rotary evaporator. The residue is recrystallized from a benzene-pentane mixture, washed with pentane and dried in a desiccator under vacuum to yield N,2,6-trimethoxy-3,5-dibromobenzamide.

Other compounds of Formula I within the scope of this invention can be prepared in the manner detailed in the above examples. In the following examples the reactants are given which can be used to prepare compounds which are within the scope of this invention but are not to be construed as limiting the invention.

EXAMPLE 10

2,4,6-trimethoxybenzoyl chloride+methoxyamine hydrochloride=N,2,4,6-tetramethoxybenzamide.

EXAMPLE 11

2,6 - dimethoxy-3,5-dichlorobenzoyl chloride+ethoxyamine hydrochloride=N-ethoxy - 2,6 - dimethoxy-3,5-dichlorobenzamide.

EXAMPLE 12

2,6 - dimethoxy-4-nitrobenzoyl chloride+ethoxyamine hydrochloride=N,2,6-trimethoxy-4-nitrobenzamide.

EXAMPLE 13

2,6-dimethoxybenzoyl chloride+n-propoxyamine hydrochloride=N-n-propoxy-2,6-dimethoxybenzamide.

The compounds of Formula II can be prepared readily by reacting 2,5-dichloro-4-bromophenol with the corresponding O-alkyl phenylthiophosphonol halide. This latter compound can be prepared from the corresponding phenylthionophosphonic dichloride by treatment with an alkyl alcohol.

The manner in which the compounds of Formula II can be prepared is illustrated in the following examples:

EXAMPLE 14

Preparation of O-methyl O-2,5-dichloro-4-bromophenyl phenylthiophosphonate 2,5-dichloro-4-bromophenol (7.5 g.; 0.025 mole) was dissolved in acetone (25 ml.) and placed in a three-neck, round-bottom flask equipped with a mechanical stirrer, internal thermometer and reflux condenser. A solution of sodium hydroxide (1 g.; 0.025 mole) in water (5 ml.) was added to the flask. The contents were stirred and a solution of O-methyl phenylthiophosphonyl chloride (5.2 g.; 0.025 mole) in acetone (25 ml.) was slowly added to the flask. The reaction mixture was stirred and heated at reflux for 15 minutes and then cooled. The reaction mixture was filtered and the filtrate distilled in vacuo to remove the acetone. The residue was extracted with diethyl ether and the extract washed with a 5% aqueous solution of sodium hydroxide (100 ml.) and then twice with water. The ether extract was dried over magnesium sulfate, filtered, and the filtrate heated under reduced pressure to remove diethyl ether and recover O-methyl O,2-5-dichloro-4-bromophenyl phenylthiophosphonate as a light yellow liquid residue having a refractive index at 22° C. of 1.6385 which solidifies on standing.

EXAMPLE 15

Preparation of 0-ethyl 0-2,5-dichloro-4-bromophenyl phenylthiophosphonate

A solution of potassium hydroxide (3.4 g.) in water (10 ml.) was added to a solution of 2,5-dichloro-4-bromophenol (12.2 g.) in acetone (100 ml.) in a three-neck, round-bottom flask equipped with a mechanical stirrer and reflux condenser. The mixture was stirred and heated at reflux. A solution of O-ethyl phenylthiophosphonyl chloride (13.2 g.) in acetone (50 ml.) was gradually added to the stirred refluxing mixture. After the addition was complete the mixture was stirred and heated at reflux for 15 minutes and then cooled. The reaction mixture was heated on a steam bath to remove acetone. The residue was extracted with diethyl ether, the extract washed with cold aqueous sodium hydroxide and with ice water and finally dried over calcium chloride. The extract was filtered from the calcium chloride crystals and heated under reduced pressure to remove the diethyl ether and then filtered through a fritted glass fiber to recover O-ethyl 0-2,5-dichloro-4-bromophenyl phenylthiophosphonate as a liquid having a refractive index at 26° C. of 1.6203 which solidifies on standing.

EXAMPLE 16

Preparation of 0-n-propyl 0-2,5-dichloro-4-bromophenyl phenylthiophosphonate 2,5-dichloro-4-bromophenol (3.5 g; 0.013 mole) was dissolved in acetone (25 ml.) and placed in a three-neck, round-bottom flask equipped with a mechanical stirrer, internal thermometer and reflux condenser. An aqueous solution of 3.0 N sodium hydroxide (5 ml.) was added to the flask. The contents were stirred and O-n-propylphenylthiophosphonyl chloride (3 g; 0.013 mole) was slowly added. The reaction mixture was refluxed for 15 minutes and then cooled. The reaction mixture was heated under reduced pressure to remove the acetone and the residue was dissolved in diethyl ether, washed with 5% aqueous sodium hydroxide solution (100 ml.), washed twice with water, dried over magnesium sulfate and filtered. The filtrate was heated in vacuo to remove the diethyl ether and to yield O-n-propyl O-2,5-dichloro-4-bromophenyl phenylthiophosphonate as the liquid residue having a refractive index at 22° C. of 1.5992.

In the manner heretofore described other compounds within the scope of the present invention can be readily prepared. Presented in the following examples are the essential ingredients required to prepare the indicated named compounds according to the procedure detailed in the foregoing examples. For the sake of brevity 2,5-dichloro-4-bromophenol will be designated as A.

EXAMPLE 17

A+O-methyl 2,4 - dichlorophenylthiophosphonyl chloride=O-methyl O-2,5-dichloro-4-bromophenyl 2,4-dichlorophenylthiophosphonate.

EXAMPLE 18

A+O-methyl 2-methyl-4-chlorophenylthiophosphonyl chloride=O-ethyl O-2,5 - dichloro-4bromophenyl 2methyl-4-chlorophenylthiophosphonate.

EXAMPLE 19

A+O-ethyl-4 - nitrophenylthiophosphonyl chloride= O-ethyl O-2,5-dichloro-4-bromophenyl-4-nitrophenylthiophosphonate.

EXAMPLE 20

A+O-ethyl 2 - chloro - 4 - nitrophenylthiophosphonyl chloride=O-ethyl O-2,5 - dichloro - 4-bromophenyl 2 chloro-4-nitrophenylthiophosphonate.

EXAMPLE 21

A+O-ethyl 3-methylphenylthiophosphonyl chloride= O-ethyl O-2,5 - dichloro-4-bromophenyl 3-methylphenylthiophosphonate.

EXAMPLE 22

A+O-ethyl 2 - methylphenylthiophosphonyl chloride =O-ethyl O-2,5-dichloro-4-bromophenyl 2-methylphenylthiophosphonate.

EXAMPLE 23

A+O-ethyl 4 - methylphenylthiophosphonyl chloride =O-ethyl O-2,5-dichloro-4-bromophenyl 4-methylphenylthiophosphonate.

For practical use as acaricides and insecticides the combination of active compounds of this invention are generally incorporated into acaricidal and insecticidal compositions which comprise an inert carrier and a pesticidally toxic amount of such a combination of active compounds. Such acaricidal and insecticidal compositions, hereinafter referred to as pesticidal compositions which can also be called formulations, enable the combination of active compounds to be applied conveniently to the site of the acarid and insect infestation in any desired quantity. These compositions can be solids such as dusts, granules, or wettable powders; or they can be liquids such as solutions, aerosols, or emulsifiable concentrates.

For example, dusts can be prepared by grinding and blending the active compounds with a solid inert carrier such as the talcs, clays, silicas, pyrophyllite, and the like. Granular formulations can be prepared by impregnating the compounds, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the combination of active compounds, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of pesticides can be dispersed under superatmospheric pressure as aerosols. However, preferred liquid pesticidal compositions are emulsifiable concentrates, which comprise an active combination of compounds according to this invention and as the inert carrier, a solvent and an emulsifier. Such emulsifiable concentrates can be extended with water and/or oil to any desired concentration of active compounds for application as a spray to the site of the acarid or insect infestation. The emulsifiers most commonly used in these concentrates are nonionic or mixtures of nonionic with anionic surface-active agents.

The active combinations of this invention can be applied as acaricides and insecticides in a manner recognized by the art. One method for destroying acarids and insects comprises applying to the locus of the acarid and insect infestation, a pesticidal composition comprising an inert carrier and as the essential active ingredient, in a quantity which is toxic to acarids and insects, a combination of active compounds of the present invention. The concentration of the new compounds of this invention in the pesticidal compositions will vary greatly with the type of formulation and the purpose for which it is designed, but generally the pesticidal compositions will comprise from about 0.05 to about 95 percent by weight of the active compounds of this invention. In a preferred embodiment of this invention, the pesticidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compositions of the present invention are also useful when combined with other acaricides or insecticides in the pesticidal compositions heretofore described. These other insecticides can comprise from about 5 to about 95 percent of the active ingredients in the insecticidal compositions. Use of the combinations of these other insecticides with the compositions of the present invention provide pesticidal compositions which are more effective in controlling acarids and insects and often provide results unattainable with separate compositions. The other acaricides and insecticides with which the compounds of this invention can be used in the pesticidal compositions to control acarids and insects, can include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbonphenothion, phorate, zinophos, diazinon, malathion, mevinphos, dimethoate, DBD, ronnel, oxydemeton-methyl, dicapthon chlorothion phosphamidon, naled, fenthion, trichlorofon DDVP and the like; organic nitrogen compounds such as dinitro-o-cresol dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2-thiocyanoethyl) ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compositions of the present invention can also be combined with fungicidal and nematocidal chemical compounds to form pesticidal compositions useful for the control of fungi and in some cases soil nematodes, as well as acarids and insects. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate and the like; while examples of nematodicidal compounds are chloropicrin, O,O-diethyl O-(2,4 - dichlorophenyl) phosphorothioate, tetrachlorothiophene, dazomet, dibromochloropropane, and the like.

The new compounds of this invention can be used in many ways for the control of acarids and insects. Pesticidal compositions which are to be used as stomach poisons or protective materials can be applied to the surface on which the acarids and insects feed or travel. Pesticide compositions which are to be used as contact poisons or eradicants can be applied directly to the body of the acarids and insects, as a residual treatment to the surface on which the acarids and insects may walk or crawl, or as a fumigant treatment of the air which the acarids and insects breathe. In some cases, the compounds applied to the soil or plant surfaces are taken up by the plant, and the acarids and insects are poisoned systematically.

The above methods of using pesticide compositions are based on the fact that almost all the injury done by acarids and insects is a direct or indirect result of their attempts to secure food. Among the acarids which can be effectively controlled with the pesticidal compositions of the present invention are the red spider mite, the two spotted mite, the strawberry spider mite, the citrus rust mite, the citrus red mite, the European red mite, the cattle tick and the poultry mite.

Among the insects which can be effectively controlled by the pesticidal compositions of the present invention are the chewing insects such as the Mexican bean beetle, the southern armyworm; the piercing-sucking insects, such as the pea aphid, the cereal leaf beetle, the house fly, the grape leafhopper, the chinch bug, the lygus bugs, oyster shell scale, the California red scale, the Florida red scale, the soft scale and mosquitoes; the internal feeders, including borers such as the European corn borer, the peach twig borer and the corn earworm, worms or weevils such as the codling moth, alfalfa weevil, cotton boll weevil, pink boll worm, plum curculio, red banded leaf roller, melonworm, cabbage looper and apple maggot, leaf miners such as the apple leaf miner, birch leaf miner and beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

The quantity of the active compounds of this invention to be used for acarid and insect control will depend on a variety of factors, such as the specific acarid or insect involved, intensity of the infestation, weather, type of environment, type of formulation, and the like. For example, the application of only one or two ounces of active chemical per acre may be adequate for control of a light infestation of an acarid or insect under conditions unfavorable for its feeding, while a pound or more of active compound per acre may be required for the control of a heavy infestation of acarids and insects under conditions favorable to their development.

Some typical pesticidal compositions which can be used in the methods of this invention are shown in the following examples in which all quantities given are in parts by weight.

EXAMPLE 24

Preparation of a wettable powder

The following components are mixed intimately in conventional mixing and blending equipment and are then ground to a powder having an average particle size of less than about 50 microns. The finished powder is dispersed in water to give the desired concentration of active compounds.

O-methyl O-2,5-dichloro-4-bromophenyl phenylthiophosphonate _____ 35.00
N-2,6-trimethoxy-3-chlorobenzamide _____ 40.00
Fuller's earth _____ 22.75
Sodium lauryl sulfate _____ 2.00
Methyl cellulose _____ .25

EXAMPLE 25

Preparation of an oil-dispersible powder

The following components are blended and ground as described in the previous example to give a powder which can be dispersed in oil to form a spray containing the desired concentration of the combination of active compounds.

O-ethyl O-2,5-dichloro-4-bromophenyl phenylthiophosphonate _____ 10.00
N,2,6-trimethoxy-3,5-dichlorobenzamide _____ 60.00
Condensation product of diamylphenol with ethylene oxide _____ 4.00
Fuller's earth _____ 26.00

EXAMPLE 26

Preparation of a granular formulation

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

O-methyl O-2,5-dichloro-4-bromophenyl phenylthiophosphonate _____ 5
N,2,6-trimethoxy-3-nitrobenzamide _____ 5
Fuller's earth _____ 66
Dextrin _____ 20
Sodium lignin sulfonate _____ 3
Kerosene _____ 1

EXAMPLE 27

Preparation of an emulsifiable concentrate

The following components are mixed together until a clear solution is obtained which can then be extended with water to any desired concentration of active compound for application to the pest infestation.

O-methyl O-2,5-dichloro-4-bromophenyl phenylthiophosphonate _____ 21.0
N,2,6-trimethoxy-3-chlorobenzamide _____ 17.4
Blend of oil soluble calcium sulfonates with polyoxyethylene ethers _____ 5.7
Xylene _____ 55.9

To demonstrate the effectiveness of the compositions of the present invention experiments were carried out for the control of the two spotted spider mite. In these experiments the test composition was formulated at the indicated concentrations by dissolving the active compounds in acetone and dispersing the solution in water containing a small amount of emulsifiers. The formulation was then applied to plants infested with 50 to 100 adults of the mites and held for five days after which the adult mortality of the mites was observed. The following tables demonstrate the unexpected advantages of the compositions of this invention. In Table 1 is presented the activity of individual compounds by themselves with Table 2 demonstrates the activity of the novel combinations of this invention. Each of the mortality rating is the average of three replicate experiments.

TABLE 1

| Test compound | Concentration, (p.p.m.) | Percent mortality |
|---|---|---|
| Product of Example 2 | 60 | 0 |
| | 100 | 4 |
| | 300 | 17 |
| | 600 | 38 |
| Product of Example 14 | 60 | 0 |
| | 100 | 1 |
| | 300 | 0 |
| | 600 | 0 |

TABLE 2

| Test combination | Concentrations, (p.p.m.) | Percent mortality |
|---|---|---|
| Product of Example 2 plus product of Example 14 | 100+100 | 95 |
| | 300+300 | 100 |
| | 600+600 | 100 |
| | 30+300 | 100 |
| | 60+600 | 100 |

I claim:

1. An acaricidal composition comprising N,2,6-trimethoxy - 3 - chlorobenzamide and O - methyl-O-2,5-dichloro-4-bromophenyl phenylthiophosphonate in a ratio of from about 1:1 to about 1:10.

2. An acaricidal composition comprising an inert carrier and, as an essential active ingredient, an acaricidally effective amount of the composition of claim 1.

3. A method of controlling acarids which comprises applying to the locus of said acarids an acaricidal composition comprising an inert carrier and, as an essential active ingredient, in a quantity toxic to acarids the composition of claim 1.

References Cited

UNITED STATES PATENTS

| 3,459,836 | 8/1969 | Richter | 260—961 |
| 3,474,124 | 10/1969 | Berliner et al. | 260—453 |

ALBERT T. MEYERS, Primary Examiner

F. E. WADDELL, Assistant Examiner

U.S. Cl. X.R.

424—324